M. C. WHITE & O. C. DURYEA.
BRIQUETING APPARATUS.
APPLICATION FILED FEB. 1, 1909.

980,374.

Patented Jan. 3, 1911.
8 SHEETS—SHEET 3.

Fig. 3.

Witnesses:
John Enders
Chas. H. Bull

Inventors:
Morris C. White and
Otho C. Duryea,
By Dyrenforth, Lee, Chritton & Wiles
Attys.

M. C. WHITE & O. C. DURYEA.
BRIQUETING APPARATUS.
APPLICATION FILED FEB. 1, 1909.

980,374.

Patented Jan. 3, 1911.
8 SHEETS—SHEET 4.

Witnesses:
John Enders.
Chas H. Buell

Inventors:
Morris C. White and
Otho C. Duryea,
By Dyrenforth, Lee, Chritton & Wiles,
Attys.

M. C. WHITE & O. C. DURYEA.
BRIQUETING APPARATUS.
APPLICATION FILED FEB. 1, 1909.

980,374.

Patented Jan. 3, 1911.
8 SHEETS—SHEET 7.

Witnesses:
John Enders
Chas. H. Buell

Inventors:
Morris C. White &
Otho C. Duryea,
By Dyrenforth, Lee, Chritton & Wiles,
Attys

UNITED STATES PATENT OFFICE.

MORRIS C. WHITE AND OTHO C. DURYEA, OF LOS ANGELES, CALIFORNIA, ASSIGNORS TO AMERICAN GAS-TOOL COMPANY, OF CHICAGO, ILLINOIS, A CORPORATION OF SOUTH DAKOTA.

BRIQUETING APPARATUS.

980,374.      Specification of Letters Patent.      Patented Jan. 3, 1911.

Application filed February 1, 1909. Serial No. 475,489.

*To all whom it may concern:*

Be it known that we, MORRIS C. WHITE and OTHO C. DURYEA, citizens of the United States, residing at Los Angeles, in the county of Los Angeles and State of California, have invented a new and useful Improvement in Briqueting Apparatus, of which the following is a specification.

This invention aims to improve the briqueting art, generally, by the production, by compression, of bricks, briquets, and the various types of molded objects, of any desired size and shape and of any suitable material, and, more especially, of great density and compactness.

In practicing our invention, we employ, as the pressure-generator, an internal-combustion power-appliance of the same general type as that forming the subject-matter of a separate application for Letters Patent, filed by us June 11, 1908, and bearing Serial Number 437,961. (Patent Number 911,187, granted February 2, 1909.)

In the accompanying drawings we show, for purposes of illustration, an internal-combustion briqueting-machine devised by us for carrying out our present invention in one of its applications. The machine is especially adapted for forming briquets from coal-dust, sawdust, peat or other fuel, or from flue-dust, pulverized ore, and other more or less finely-divided material. The material to be briqueted is fed, in the present construction, into intermittently-movable molds, which, when filled, register with compressing plungers mounted upon a cross-head. On the frame of the machine is an internal-combustion cylinder containing a piston and also a motor-operated pump for compressing an explosive charge in the cylinder behind the piston at regulated intervals. The piston is connected, through pressure-multiplying means, with the cross-head.

In operation, the explosive mixture or charge, while being initially compressed, forces the piston outward and moves the briquet-forming plungers against the material in the molds. The continued working of the pump thereafter raises the pressure of the charge behind the piston to a predetermined degree governed by the resistance of a supplemental spring-returned piston. When the pressure of the charge approximates the said predetermined degree, the said supplemental piston is moved to actuate sparker-mechanism and explode the charge. The force of the explosion against the main piston is exerted, through the pressure-multiplying means and cross-head and plungers carried thereby, against the material in the molds. The molds are open passages through a movable platform or work-table, and, when they are moved to register with the briquet-forming plungers at their upper sides, they also register with plungers actuated from the same power-appliance entering their under sides. Thus the briquets are formed by squeezing operations between upper and lower plungers in molds. After the plungers reach the limit of their compressing strokes the exhaust-valve of the main cylinder is opened permitting spring-returning means connected with the cross-head to raise the latter and force the main piston to the end of its travel in the backward direction, thereby scavenging the cylinder.

In the present machine the motor and pump work constantly, but, in the movement of the said supplemental piston in the direction of actuating the sparking-device, further compression of the charge in the main cylinder is stopped. When the main piston reaches the limit of its stroke in the backward direction, the exhaust-valve is closed and the means for moving the molding-table is actuated to turn the same one-sixth of a revolution to bring a new set of filled molds into register with the briquet-forming plungers and carry the molds containing finished briquets beneath ejecting-plungers. When the table has been thus moved, compression of the charge in the cylinder is automatically started.

Referring to the drawings

The main frame is formed with sides or cheeks 20, 21, with hollow, tubular braces or cross-bars 22, 23. Firmly anchored to the cross-bar 23 is our internal-combustion power-appliance of which 24 is the internal-combustion cylinder containing a main piston 25. The stem 26 of the piston extends through a stuffing-box 27 in the cylinder-head, and is connected at its outer end with the knuckle, or joint, 28 of upper and lower toggle-leaves 29, 20. The upper toggle-leaf 29 is connected with an upper cross-head 30. Extending downward from opposite ends of the upper cross-head are rods 31, 31, movable through guide-brackets 32, 33, on the cheeks. At their lower end-portions the rods 31 pass through a lower cross-head 34. This latter cross-head rests upon collars 35 surrounding the rods and adjustable thereon by means of nuts 36. At their lower ends the rods bear against cushioning-springs 37. On the cross-head 34, in the positions indicated, are two sets of lower briquet-forming plungers 38, 39, respectively, each set containing six plungers.

Figure 4:
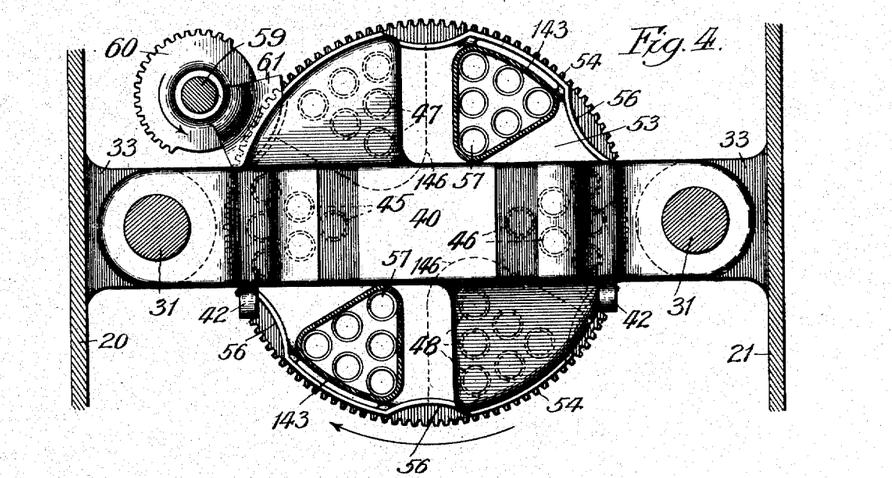
Figs. 4 and 5, enlarged plan sections taken, respectively, on lines 4 and 5 in Fig. 2.

The lower toggle-leaf 29 is pivotally connected at its end with a cross-head 40, of the shape shown in Fig. 4, through opposite end-portions of which are openings fitting loosely around the rods 31. The rods thus operate as guides for the cross-head 40. On the upper cross-head 30 is a pair of perforated lugs 41, and on the cross-head 40 is a pair of perforated lugs 42. The said two cross-heads are connected by springs 43 and rods 44, the springs tending normally to draw the said cross-heads toward each other, and thereby operate as returning means for the toggle-mechanism and main piston. On the under side of the cross-head 40 are two sets of upper briquet-forming plungers 45, 46, respectively, there being six plungers in each set registering exactly with the lower sets of plungers 38, 39. The cross-head 40 also carries two sets of ejecting-plungers 47, 48, respectively, in the relative positions indicated, and located with reference to each other the same as the aforesaid upper and lower briquet-forming plungers. The ejecting-plungers are of greater length than the briquet-forming plungers, as indicated.

Extending between the cheeks 20, 21, in a plane between the cross-heads 34, 40, are two supporting frames 49, 50, provided at their ends with outwardly-projecting flanges 51 at which they are firmly secured to the cheeks. The frames are at opposite sides of the rods 31, and, between the said rods, describe segments of a circle. The said segmental portions are provided in their upper sides with V-shaped notches 52 forming the segments of an annular guide-groove or track.

Figure 5:
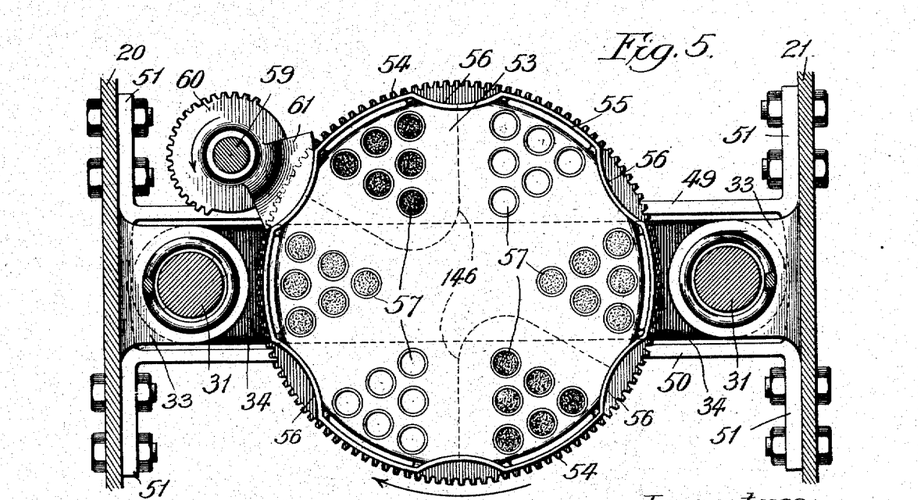

53 is a molding-table of disk-shape and provided around its edge with gear-teeth 54. Formed integral with the mold-table, and rising therefrom around its edge-portion, is a rim 55 shaped to present six vertical, segmental sockets 56, equi-distant apart. Extending through the table are six sets of mold-openings 57, located equi-distant apart between the rim-sockets 56 and disposed with relation to each other, as indicated in Figs. 4 and 5, to register exactly with the plungers carried by the cross-heads 34 and 40. Journaled in similar bearing-brackets 58, toward the upper and lower ends of the cheek 20, is a vertical shaft 59 carrying a mutilated-gear 60 in position to mesh with the gear 54 on the mold-table, and also carrying a segmental stop 61 adapted to engage the sockets 56. On the shaft 59, in the position indicated, is an adjustable cam 62, and the shaft also carries, in the position shown, a worm-gear 63.

Mounted upon the main cylinder 24 is an electric motor 64. At the rear end of the said cylinder are the two cylinders 65, 66, respectively, of a compressor in which work pistons 67 connected with a crank-shaft 68 forming an extension of the armature-shaft of the motor.

Figure 3:
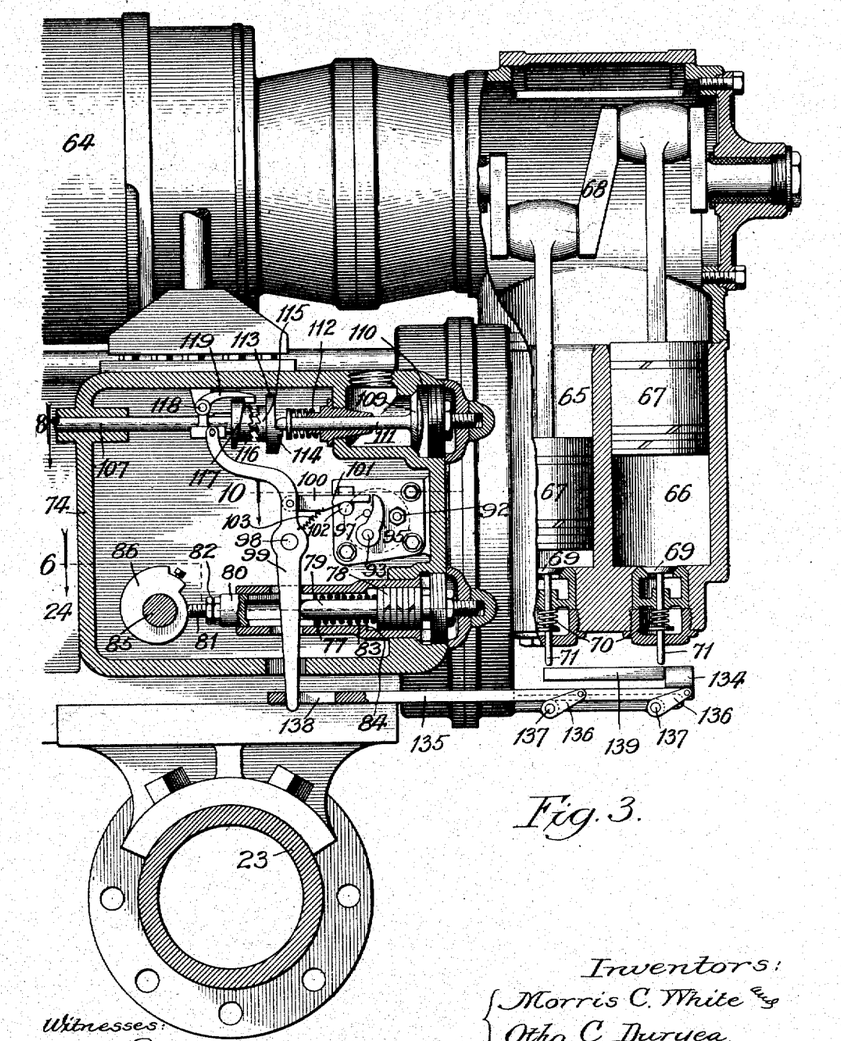
Fig. 3, an enlarged view, partly in section and partly in side-elevation, of the power-generating portion of the machine.

In Fig. 3 are shown the induction-valves 69 of the compressor-cylinders, the said valves having closing-springs 70, surrounding the valve-stems 71 which project below the compressor-cylinders. Adjacent to the induction-valves are the compressor-cylinder eduction-valves 72, communicating with a port 73 leading to the cylinder 24. Cast upon the side of the cylinder 24 is a controller-box 74 having a removable cover or face-plate 75. Cored from the interior of the cylinder 24 to the interior of the controller-box is a passage 76 terminating in a supplemental cylinder 77 in the controller-box. The supplemental cylinder contains a piston 78 having a stem 79. Fitting the cylinder 77 is a sliding sleeve-piece 80 provided in its end with an adjustable screw 81 carrying jam-nuts 82. The piston-stem 79 is guided in the sleeve 80 and is surrounded by a spring 83 confined between the sleeve and piston.

Figure 6:
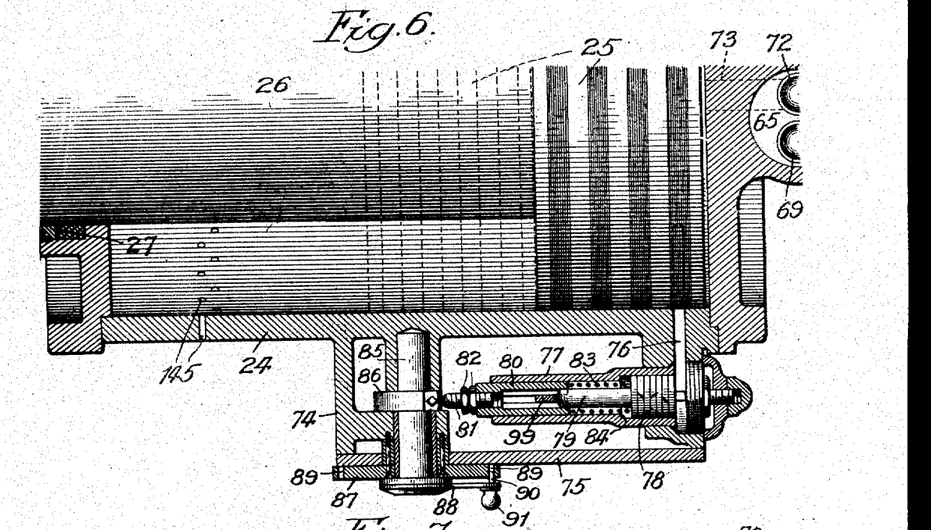
Fig. 6, an enlarged, broken section taken on line 6 in Fig. 3, and illustrating the main and supplemental pistons in the positions they occupy initially, and showing, by dotted lines, the position of the main piston just previous to final compression of the charge in the main cylinder.
Figure 7:
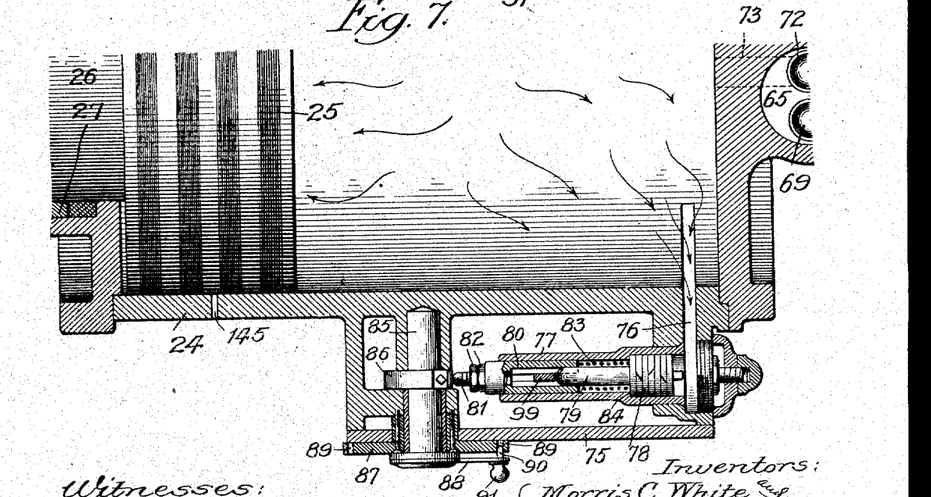
Fig. 7, a view similar to Fig. 6, but showing the position to which the main piston is driven under the force of an explosion and the position occupied by the supplemental piston from the time of final compression until the time of exhaust.
Figure 8:
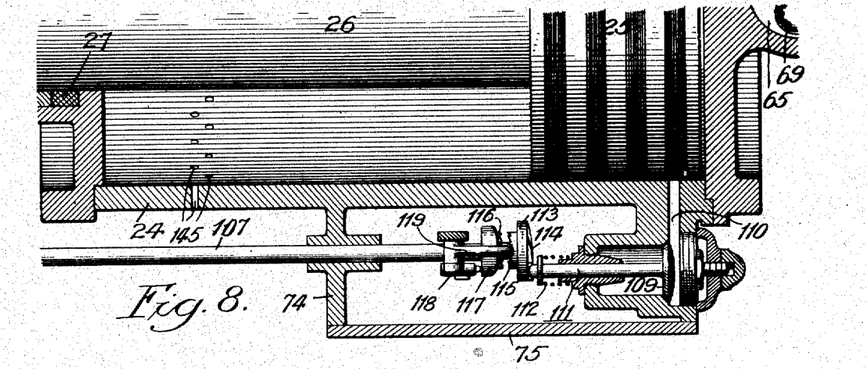
Fig. 8, an enlarged broken section taken on line 8 in Fig. 3 illustrating the exhaust-valve and its actuating means in one position.

As hereinafter explained, the piston is held normally by the spring 83 in the position shown in Fig. 6, being movable therefrom to an annular stop 84, as indicated in Fig. 7. Extending through the cover 75, and journaled therein and in the controller-box is a short shaft 85 carrying an adjustable cam 86 engaging the end of the screw 81. The shaft 85 extends through a dial-plate 87 on the cover 75 and, beyond the said plate, carries a lever 88. The dial-plate is formed with perforations 89 to receive a plunger 90 on a handle 91 carried by the lever 88. By turning the lever 88, and thus turning the shaft 85, the cam 86 may be turned to move the sleeve 80 and thereby tension the spring 83 against the piston 78.

Figure 10:
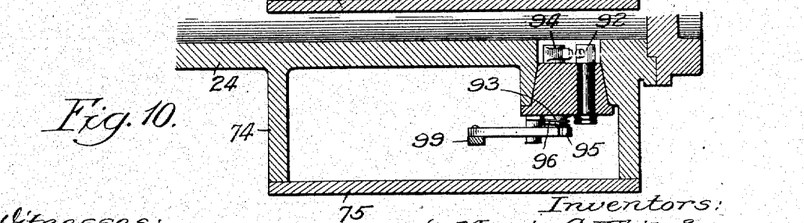
Fig. 10, an enlarged detail section taken on line 10 in Fig. 3 showing the sparker and its operating means.

In the cylinder 24, as indicated in Fig. 10, is a stationary contact 92 of a make-and-break electric sparker. Extending from the controller-box into the cylinder is a short rock-shaft 93 carrying the movable contact 94 of the sparker. On the shaft 93, in the controller-box, is a finger 95, and surrounding the shaft is a coil-spring 96 which tends normally to press the finger against a stop 97 in which position the parts 92, 94, are out of contact, as shown in Fig. 10. Pivoted at 98 in the controller-box is a lever 99 having a downwardly-extending arm passing through openings in the cylinder 77, sleeve 80 and lower wall of the controller-box to some distance below the latter, as indicated most plainly in Fig. 3. The lever is in the path of the stem 79 of the piston 78 in the movement of the latter from the position shown in Figs. 3 and 6 to that shown in Fig. 7. Pivotally connected with the upper arm of the lever is a swinging finger or latch 100 having a cam-edge 101 and held normally against a stop 102 (which may be in the form of a roller) by a spring 103. When the lever 99 is swung, by movement of the piston 78 to the stop 84, the latch 100 is moved against the finger 95 to swing the latter and turn the contact 94 against the contact 92. In this movement the latch is swung in the upward direction by the engagement of its cam 101 with the stop or roller 102, and, as it nears the end of its movement, it swings out of engagement with the finger 95 thereby permitting the latter to be returned by its spring to the stop 97, breaking the sparking circuit to produce a spark in the well known manner.

The armature-shaft 104 rotates constantly, in the present construction, and carries a pinion 105 and a bevel-pinion 106. Extending into the controller-box, and journaled therein, is a shaft 107 carrying a gear-wheel 108 meshing with the pinion 105.

109 is an exhaust-valve interposed in the exhaust-passage 110 of the cylinder 24. The stem 111 of the exhaust-valve extends nearly, but not quite, in alinement with the shaft 107, a spring 112 tending to hold the exhaust-valve closed. Loose upon the inner end of the shaft 107 is a disk 113 formed with a cam 114 working against the end of the exhaust-valve stem 111. The disk 113 carries a clutch-member 115. Feathered upon the shaft 107 is a clutch-member 116 provided with a cam 117. Fulcrumed on a bracket at 118 is a swinging, clutch-shifting, bell-crank lever 119 having an upper arm movable to project into the path of the cam 117 and having a lower arm movable against the clutch-member 116 to slide the latter into engagement with the clutch-member 115. The lower arm of the lever 119 is pivotally connected with the end of the upper arm of the lever 99. The clutch-mechanism described is of a common construction well known in the art. When the lever 99 is swung, by movement of the piston 78 in the direction of the stop 84, the bell-crank lever 119 is swung to raise its upper arm out of engagement with the cam 117 and cause the lower arm to slide the clutch-member 116 into engagement with the clutch-member 115. When the levers are swung in the opposite direction, the lever 119 moves at its end into the path of the cam 117, whereby, in the completion of a revolution of the shaft 107, the clutch-member 116 is moved out of engagement with the clutch-member 115.

Figure 11:
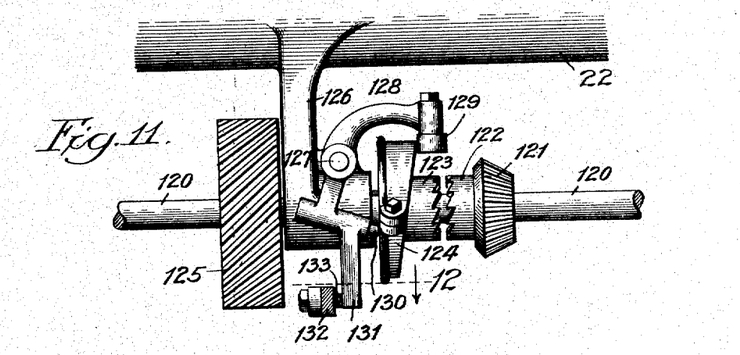
Fig. 11, an enlarged broken sectional view of clutch-mechanism on the counter-shaft from which the mold-table is operated.

Extending at right-angles to the motor-shaft, and journaled in the main frame, is a countershaft 120 (in Fig. 11) upon which is loosely mounted a bevel-pinion 121 in mesh with the bevel-pinion 106. The pinion 121 carries a clutch-member 122 and is rotated constantly from the motor-shaft. Feathered upon the shaft 120 is a sliding clutch-member 123 carrying a cam 124. Fixed to the shaft 120 is a worm-wheel 125 meshing with the worm-wheel 63 on the vertical shaft 59. The shaft 120 passes through a bracket 126 depending from the bar 22; and fulcrumed at 127 upon the said bracket is a bell-crank lever 128 of the same general construction as the lever 119 before described. The lever 128 carries a roller 129 to engage the cam 124, and its lower arm carries a projection 130 to engage and push the sliding, feathered clutch-member 123. On the bell-crank lever 128 is an arm 131. The upper toggle-leaf 29 carries a bracket 132 (see Fig. 12) equipped at its end with a spring-plunger 133. Normally, the shaft 120 is stationary, the clutch-members 122, 123 being out of engagement. When the toggle-mechanism is flexed, the spring-plunger 133, carried by the upper toggle-leaf 29, moves against the arm 131 of the clutch-shipping bell-crank lever swinging the latter to raise the roller 129 out of contact with the cam 124 and sliding the clutch-member 123 into engagement with the clutch-member 122. This causes the shaft 120, with its worm-wheel 125, to be rotated one complete revolution and rotates the shaft 59 and gear 60, with its segmental projection 61, one revolution. The parts are so constructed and arranged that the engagement of the mutilated gear 60 with the gear 64 of the mold-table rotates the latter exactly one-sixth of a revolution, and just as this movement of the mold-table is completed the segment 61 engages a segmental socket 56 of the table and locks the latter firmly against movement.

Figures 12, 13:
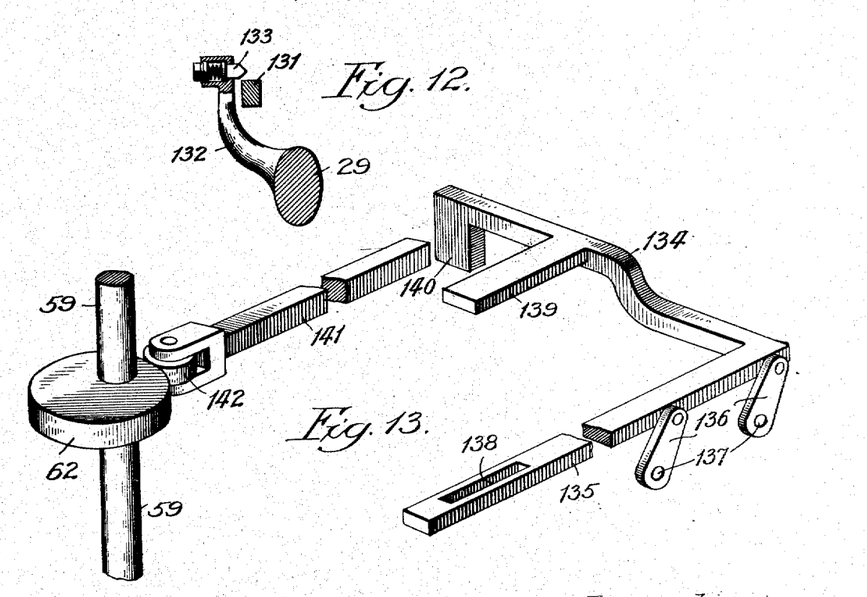
Fig. 12, a detail section taken on line 12 in Fig. 11.
Fig. 13, an enlarged, broken and perspective detail view of timed means for opening the pump-inlet valves to stop compression.

Mounted against the under side of the cylinder 24 is a sliding frame 134 (see Fig. 13). This frame has an arm 135 supported upon swinging fingers 136 pivoted at 137 to a stationary part of the pump-cylinder structure. The arm 135 contains a socket 138 through which the lever 99 passes near its lower end. On the frame 134 is an arm or lug 139 projecting beneath the stems 71 of the pump induction-valves 69. In the movement of the lever 99 from the position shown in Fig. 3 toward the left, the frame 134 is slid by the said lever and caused to rise by the swinging fingers 136. In this rise of the frame the lug 139 engages the valve-stems 71 and holds the pump induction-valves open, thereby preventing the pumps from compressing and discharging explosive mixture into the main cylinder. The frame 134 carries a lug 140 which is in the path of a longitudinally-sliding rod 141 mounted beneath the cylinder. On the end of the rod is a roller 142 engaging the adjustable cam 62 on the vertical shaft 59.

Extending over the mold-table, and terminating at their lower ends close to the upper surface of said tables, are feed-chutes 143. These diametrically-opposed chutes are shaped at their lower ends, as indicated in Fig. 4, each to register with a set of briqueting molds. The chutes may extend from a material-supplying hopper, not shown, and from which the material descends by gravity through the chutes to fill the molds when registering therewith.

Figure 1:
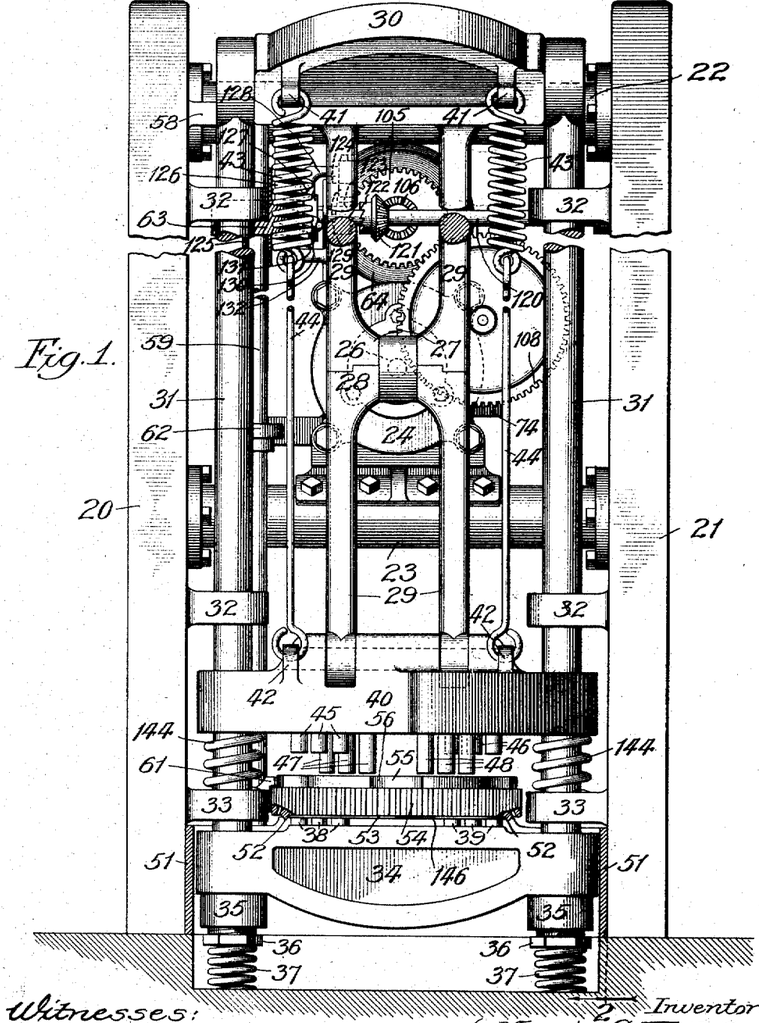
—Figure 1 is a partly broken, front elevation of the machine constructed with toggle-mechanism, as the pressure-multiplying means, between the power-generator and work-performing plungers.
Figure 2:
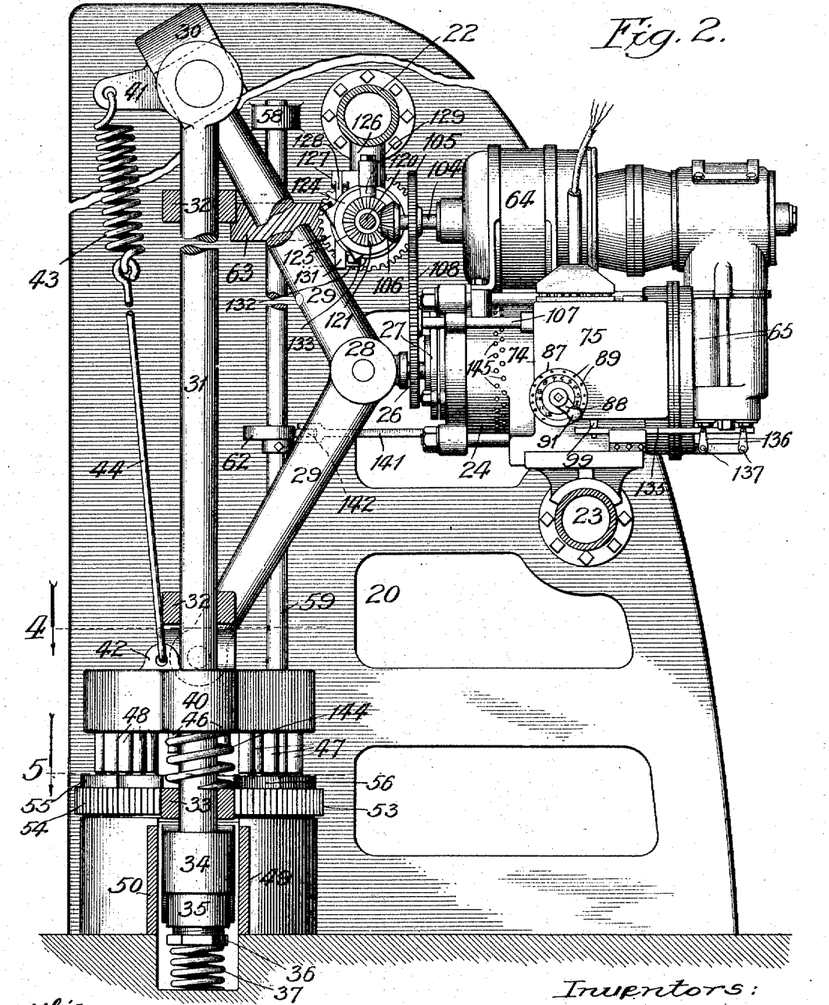
Fig. 2, a broken, sectional side-elevation, the section being taken on line 2 in Fig. 1.
Figure 9:
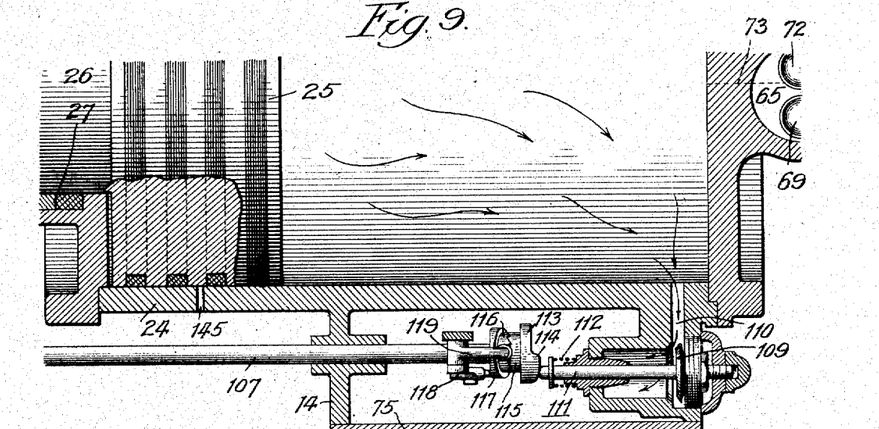
Fig. 9, a view of the same parts as Fig. 8, with the moving parts in the position of opening the exhaust.
Figure 14:
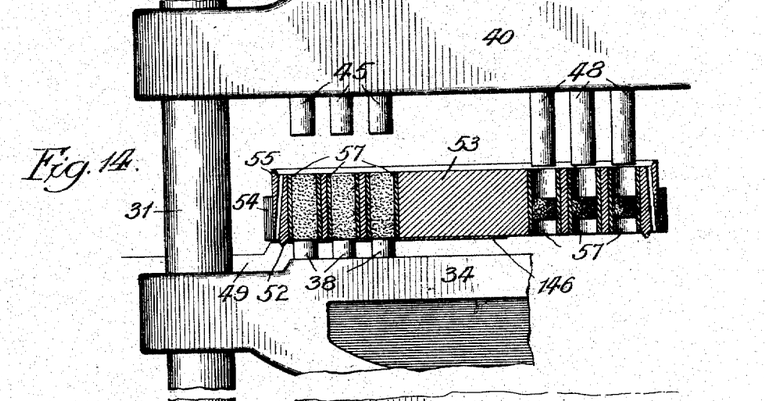
Fig. 14, an enlarged broken sectional view showing the intermittently-rotating mold-table with the briquet-forming and briquet-ejecting plungers in their initial positions.
Figures 15, 16:
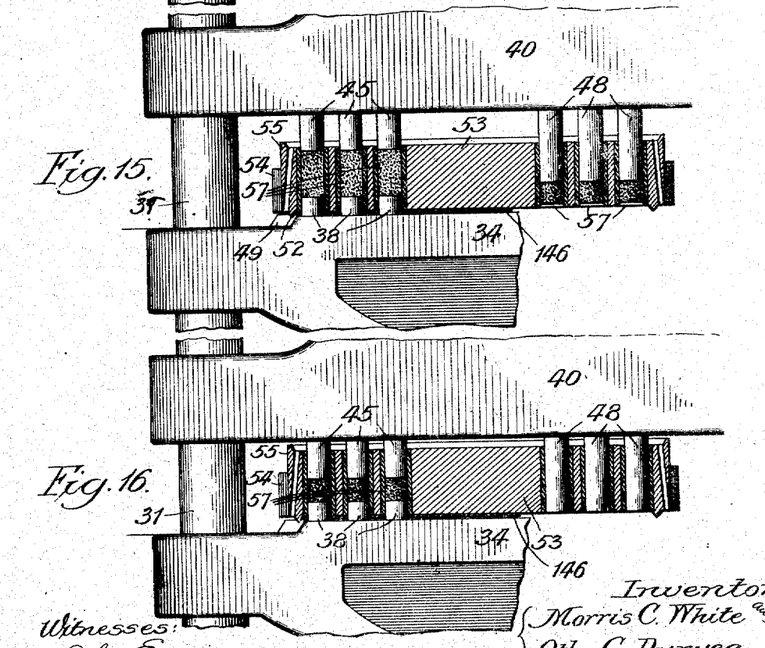
Fig. 15, a view the same as Fig. 14, and showing the positions of the plungers at the time of final compression of the explosive charge in the cylinder previous to explosion.
Fig. 16, a view the same as Figs. 14 and 15, showing the positions of the plungers between the times of explosion and exhaust.

The operation is as follows: It is to be understood that the feed-table in each movement is advanced exactly one-sixth of a revolution, and, during each pause, twelve of its mold-openings register with the feed-chutes; twelve register with the briqueting-plungers; and twelve register with the ejecting-plungers. Initially, the moving parts are in the position indicated in Figs. 1, 2 and 3. The constantly-operating electric-motor actuating the pump-pistons discharges explosive mixture through the port 73 into the main-cylinder behind the piston and moves the latter from the position indicated by full lines in Fig. 6 to the position indicated by dotted lines therein. In this movement of the piston the pressure-multiplying toggle-mechanism is extended causing the upper and lower briqueting-plungers to move from the position shown in Fig. 14 to that shown in Fig. 15, thereby initially compacting the briquet material. This engagement of the plungers with the briquet material stops further movement of the piston and toggle-mechanism, permitting the pressure behind the piston to be raised by the pumps to the desired degree. This degree of compression is regulated by the resistance of the spring 83 in the supplemental cylinder 77, the tension of said spring being governed by the engagement of the cam 86 with the screw-extension 81 of the sliding sleeve 80. When the compression behind the piston 25, and consequently against the supplemental piston 78, exceeds the resistance of the spring 83, the said piston 78 is moved to the stop 84. In this movement it swings the lever 99 from the position shown in Fig. 3 in the direction to the left, thereby sliding the frame 134, as before described, and opening the pump induction-valves to stop further compression. At the same time, the latch 100 is moved to swing the finger 95 of the sparking mechanism to close the sparker-circuit and then release the finger to permit the sparker-contacts to be sprung apart by the spring 96 and ignite the charge. The explosion, in practice, occurs immediately after the stoppage of the compression. Under the force of the explosion, the piston 25 is driven to the position shown in Fig. 9, extending the toggle and forcing the upper briqueting-plungers to the position indicated in Fig. 16 to produce the briquets. It is to be understood that in the initial movement of the briqueting-plungers, before described, the lower cross-head 34 is raised until stopped by contact with the stops 33, so that under the force of the explosion the upper briqueting-plungers squeeze the briquet material into briquets. In the downward movement of the cross-head 40 the ejecting-plungers are moved into molds and discharge briquets previously formed.

In the final movement of the lever 99 producing the explosion, as described, the clutch-shipping bell-crank lever 119 is swung, as before described, to produce engagement between the clutch-members 115, 116. The cam 114 has an abrupt shoulder, as indicated in Fig. 3. When the clutch-members 115, 116, engage, the disk 113 is turned by the shaft 107, the speed of rotation, owing to the ratio of gearing with the motor-shaft, being comparatively slow. The parts are so timed that the cam 114 is not turned against the stem 111 to open the exhaust-valve 109 until the toggle-levers have been extended to the degree desired, which is nearly, but not quite, a straight line. As soon as the exhaust-valve is opened, pressure escapes from the main and supplemental cylinders, permitting the supplemental piston 78 to return to initial position and turn the bell-crank lever 119, whereby, as the clutch-member 115 reaches the limit of its turn, the cam 114 permits the exhaust-valve to close and the clutch-members are disengaged.

The downward movement of the upper cross-head 40 is against the resistance of confined cushioning-springs 144 and the springs 43. When the exhaust-valve is opened the springs 43 and 144 operate to raise the cross-head 40, flex the toggle-mechanism, lower the cross-head 34 and move the piston backward to its initial position, thereby scavenging the cylinder. The parts are so timed that the exhaust-valve is not permitted to close until the main piston reaches its initial position.

As the upper toggle-lever flexes, the spring-plunger 133 engages the arm 131 of the toggle-shipping bell-crank lever 128 and moves the latter, as before described, to bring the clutches 122 and 123 into engagement. Thus, just after the briquet-forming and ejecting-plungers have risen from the molds, the mutilated gear 60 engages the gear 54 and rotates the mold-table one-sixth of a revolution, as before described. The spring-plunger 133, when it has swung the bell-crank lever 128 to close the clutch-mechanism, wipes past the arm 131 permitting the bell-crank lever to swing, engage the cam 124 again and release the clutch when the shaft 120 has completed exactly one revolution. In the single rotation of the vertical shaft 59, thus brought about, the cam 62 thrusts the bar 141 and slides the frame 134 to its initial position (shown in Fig. 3) causing the lug 139 to descend and the pump induction-valves to close. The above operations are repeated, and, in each, twelve molds are filled, twelve briquets are formed and twelve completed briquets are ejected.

Near the forward end of the cylinder 24 is a series of air-inlet openings 145, the space between said openings and stuffing-box 127 operating as an air-cushion to prevent the main piston from striking the cylinder-head. The lower ends of the feed-chutes 143 are very close to, but out of contact with, the upper surface of the mold-table, and, when molds are filled, the contents thereof do not extend above the surface of the table. Secured to the stationary part or track 52, in a plane just below the under surface of the mold-table, is a plate or platform 146, indicated by dotted lines in Fig. 5, and operating to prevent the loose briqueting material, when fed into the molds and as the latter are turned to register with the briqueting-plungers, from running out.

In the drawings it has not been thought necessary to show the means through which explosive mixture is conducted to the pump-cylinders. The inlet-ports may be connected with any suitable mixing-valve or carbureter common in the gas-engine art. When the pump-induction valves are opened and held open, as described, a small amount of explosive mixture will be simply moved back and forth. Therefore, there is practically no waste of the mixture. As the force of an explosion in the main cylinder against the piston 25 depends upon the degree of compression of the mixture at the time of the explosion, the force of the explosion is easily regulated by turning the cam 86 with reference to the dial-plate 87.

The machine illustrated in the drawings is designed to make approximately fifteen strokes a minute and produce, therefore, approximately one hundred and eighty briquets a minute, weighing, when of bituminous coal, about fourteen ounces each. The machine, therefore, has a capacity of approximately five tons of briquets an hour. The degree of possible compression is limited only by the strength of parts of the machine, and, while in briqueting certain materials a compressing force in the molds of, say, but five tons per square inch will suffice, other materials, especially where no binder is employed, are preferably briqueted under a force of, say, twenty or more tons per square inch. Naturally, it takes somewhat longer to compress the explosive mixture when high pressure is desired than where the pressure desired is lower, but the difference in time is comparatively little. In operation, the briquet-forming plungers move against the material and then squeeze. Their operations are exerted in the form of pressure, as distinguished from impacts. As a result, the briquets are of approximately the same density throughout and have a compactness and desirable characteristics not found in any other briquets. These characteristics are due to the fact that they are formed under pressure generated from an explosive mixture which applies pressure with great speed, as well as with great force.

We realize that considerable variation is possible in the details of construction of our improved device without departing from the spirit of our invention, as defined by the claims. We do not, therefore, intend to limit ourselves to the specific construction herein shown and described. Nor do we limit our invention to the employment of a power device in which the piston moves, for the reason that it is quite common in internal-combustion power-generators, employing a piston and cylinder, to have the piston move with relation to the cylinder or to have both the piston and cylinder move, respectively in opposite directions, under the force of an explosion in the cylinder. Since one form is regarded as a mere reversal of the other, our invention contemplates the employment of either, and the more direct or immediate operate connection of the work-performing member would naturally be with the relatively movable part or parts, whether the piston, or cylinder, or both.

What we claim as new and desire to secure by Letters Patent is—

1. In apparatus for forming briquets, or the like, the combination of an internal-combustion power-generator having a piston, and cylinder, forming parts movable one with relation to the other, and molding mechanism having a movable squeezing-member operatively connected with said moving part to be actuated thereby to produce a squeezing operation with each movement under the force of an explosion in the cylinder.

2. In apparatus for forming briquets, or the like, the combination of an internal-combustion power-generator having a piston, and cylinder, forming parts movable one with relation to the other, molding mechanism having a movable squeezing-member operatively connected with said moving part to be operated thereby to produce a squeezing operation with each movement under the force of an explosion, and pressure-multiplying means interposed between the said moving part and squeezing-member.

3. In apparatus for forming briquets, or the like, the combination of an internal-combustion power-generator having a cylinder and piston, forming parts movable one with relation to the other, means for compressing an explosive charge in the cylinder against the piston, and means for exploding the compressed charge, and molding mechanism having a movable squeezing-member operatively connected with said moving part to be actuated thereby to produce a squeezing operation with each explosion of a compressed charge.

4. In apparatus for forming briquets, or the like, the combination of an internal-combustion power-generator having a cylinder and piston, forming parts movable one with relation to the other, means for compressing an explosive charge in the cylinder against the piston and means for exploding the compressed charge, molding mechanism having a movable squeezing-member operatively connected with said moving part to be actuated thereby to produce a squeezing operation with each explosion of a compressed charge, and pressure-multiplying means interposed between the said moving part and squeezing-member.

5. In apparatus for forming briquets, or the like, the combination of an internal-combustion power-generator having a cylinder and piston, forming parts movable one with relation to the other, motor-operated means for compressing a charge in the cylinder against the piston and means for exploding the compressed charge, and molding mechanism having a movable squeezing-member operatively connected with said moving part to be actuated thereby to produce a squeezing operation with each explosion of a compressed charge.

6. In apparatus for forming briquets, or the like, the combination of an internal-combustion power-generator having a cylinder and piston, forming parts movable one with relation to the other, motor-operated means for compressing an explosive charge in the cylinder against the piston, means for regulating the degree of compression of the charge and means for exploding the compressed charge, and molding mechanism having a movable squeezing-member operatively connected with said moving part to be actuated thereby to produce a squeezing operation with each explosion of a compressed charge.

7. In apparatus for forming briquets, or the like, the combination of an internal-combustion power-generator having a cylinder and piston forming parts movable one with relation to the other, means for compressing an explosive charge in the cylinder against the piston and means for exploding the compressed charge, molding mechanism having a movable squeezing-member operatively connected with said moving part to be actuated thereby to produce a squeezing operation with each movement under the force of an explosion, and means operating automatically to exhaust the cylinder when the squeezing operation is completed.

8. In apparatus for forming briquets, or the like, the combination of an internal-combustion power-generator having a cylinder and piston forming parts movable one with relation to the other, means for compressing an explosive charge in the cylinder against the piston and means for exploding the compressed charge, molding mechanism having a movable squeezing-member operatively connected with said moving part to be actuated thereby to produce a squeezing operation with each movement under the force of an explosion, means operating automatically to exhaust the cylinder when the squeezing operation is completed, and means operating automatically to close the exhaust when the said moving part reaches the limit of its return-stroke.

9. In apparatus for forming briquets, or the like, the combination of an internal-combustion power-generator having cylinder and piston forming parts movable one with relation to the other, means for compressing an explosive charge in the cylinder against the piston and means for exploding the compressed charge, molding mechanism having a movable squeezing-member operatively connected with said moving part to be actuated thereby to produce a squeezing operation with each movement under the force of an explosion, means operating automatically to exhaust the cylinder when the squeezing operation is completed, means operating automatically to stop further compression of the charge when the same approximates a predetermined limit, and means operating automatically to start compression in the cylinder when the said moving part reaches the limit of its return-stroke.

10. In apparatus for forming briquets, or the like, the combination of an internal-combustion power-generator having a cylinder and piston forming parts movable one with relation to the other, a motor-operated pump provided with an induction-valve and operating to compress an explosive charge in the cylinder against the piston, means for igniting the compressed charge, molding mechanism having a movable squeezing-member operatively connected with said moving part to be actuated thereby to produce a squeezing operation with each movement under the force of an explosion, means actuated by the compressed charge in the cylinder to open said induction-valve when the pressure of the charge approximates a predetermined limit thereby stopping further compression, and means operating automatically to close said induction-valve when the said moving part reaches the limit of its return-stroke.

11. In apparatus for forming briquets, or the like, the combination of an internal-combustion power-generator having a cylinder and piston, forming parts movable one with relation to the other, means for compressing an explosive charge in the cylinder against the piston, means for igniting the compressed charge and cylinder-exhausting means, a briquet-mold, and a briquet-squeezing plunger coöperating with said mold and operatively connected with said moving part.

12. In apparatus for forming briquets, or the like, the combination of an internal-combustion power-generator having a cylinder and piston, forming parts movable one with relation to the other, a motor and pump for compressing an explosive charge in the cylinder against the piston, means for igniting the compressed charge and cylinder-exhausting means, a movable briquet-mold, a briquet-squeezing plunger coöperating with said mold and operatively connected with said moving part, and means operatively connected with the motor for moving the mold into register with said plunger.

13. In apparatus for forming briquets, or the like, the combination of an internal-combustion power-generator having a cylinder and piston, forming parts movable one with relation to the other, means for compressing an explosive charge in the cylinder against the piston, means for igniting the compressed charge and cylinder-exhausting means, a briquet-mold open at opposite ends, and coöperating briquet-squeezing plungers movable into opposite ends of said mold and operatively connected with said moving part.

14. In apparatus for forming briquets, or the like, the combination of an internal-combustion power-generator having a cylinder and piston, forming parts movable one with relation to the other, a motor and pump for compressing an explosive charge in the cylinder against the piston, means for igniting the compressed charge and cylinder-exhausting means, a movable mold-table provided with a plurality of molds, a briquet-squeezing plunger operatively connected with said moving part, means operatively connected with said motor for moving said table to bring the molds successively into register with said squeezing-plunger, and an ejecting-plunger operatively connected with said moving part.

15. In apparatus for forming briquets, or the like, the combination of an internal-combustion power-generator having a cylinder and piston, forming parts movable one with relation to the other, a motor and pump for compressing an explosive charge in the cylinder against the piston, means for igniting the compressed charge and cylinder-exhausting means, a mold-table having a plurality of molds open at their opposite ends, a cross-head operatively connected with said moving part, briquet-squeezing and ejecting-plungers carried by said cross-head, and means operatively connected with the motor for moving the mold-table to carry the molds successively into register with said briquet-squeezing and briquet-ejecting plungers.

16. In apparatus for forming briquets, or the like, the combination of an internal-combustion power-generator having a cylinder and piston, forming parts movable one with relation to the other, a motor and pump for compressing an explosive charge in the cylinder against the piston, means for igniting the compressed charge and cylinder-exhausting means, a mold-table provided with a plurality of sets of briquet-molds open at opposite ends, briquet-material supplying means extending to said table, briquet-squeezing plungers and briquet-ejecting plungers, all said plungers being operatively connected with said moving part, and means operatively connected with said motor for moving the mold-table to cause each set of molds to register successively with said supplying-means, then with said squeezing-plungers and then with said ejecting-plungers.

17. In apparatus for forming briquets, or the like, the combination of an internal-combustion power-generator having a cylinder and piston, forming parts movable one with relation to the other, a motor and pump for compressing an explosive charge in the cylinder against the piston, means for igniting the compressed charge and cylinder-exhausting means, a mold-table provided with a plurality of sets of briquet-molds open at opposite ends, briquet-material supplying-means extending to said table, briquet-squeezing plungers and briquet-ejecting means, all said plungers and ejecting means being operatively connected with said moving part, and means actuated by said motor for moving the mold-table to cause each set of molds to register successively with said supplying-means, then with said squeezing-plungers, and then with said ejecting-means, segmental sockets in the mold-table and a segmental stop movable into one of said sockets at the completion of each movement of the mold-table.

18. In apparatus for forming briquets, or the like, the combination of an internal-combustion power-generator having a cylinder and piston, forming parts movable one with relation to the other, a motor and pump for compressing an explosive charge in the cylinder against the piston, means for igniting the compressed charge and cylinder-exhausting means, a rotary mold-table provided with a plurality of sets of briquet-molds open at opposite ends, briquet-material supplying-means extending to said table, briquet-squeezing plungers and briquet-ejecting means, all said plungers and ejecting-means being operatively connected with said moving part, and means for turning the mold-table to cause each set of molds to register successively with said supplying-means, then with said squeezing plungers and then with said ejecting-means, operatively connected with said motor and actuated thereby when the plungers are withdrawn from the molds.

MORRIS C. WHITE.
OTHO C. DURYEA.

In presence of—
R. A. RAYMOND,
CHAS. E. GAYLORD.